(12) United States Patent
Okada et al.

(10) Patent No.: US 7,065,270 B2
(45) Date of Patent: Jun. 20, 2006

(54) OPTICAL TRANSMISSION DEVICE

(75) Inventors: Junji Okada, Nakai-machi (JP);
Takehiro Niitsu, Nakai-machi (JP);
Tsutomu Hamada, Nakai-machi (JP);
Hidenori Yamada, Nakai-machi (JP);
Hiroshi Oikawa, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 232 days.

(21) Appl. No.: 10/628,379

(22) Filed: Jul. 29, 2003

(65) Prior Publication Data

US 2004/0071435 A1    Apr. 15, 2004

(30) Foreign Application Priority Data

Jul. 30, 2002  (JP)  .............................. 2002-220945

(51) Int. Cl.
*G02B 6/26*  (2006.01)
*G02B 6/10*  (2006.01)

(52) U.S. Cl. ........................ 385/31; 385/32; 385/146
(58) Field of Classification Search ................ 385/31, 385/32, 146
See application file for complete search history.

(56) References Cited

U.S. PATENT DOCUMENTS

| 6,553,170 | B1 * | 4/2003 | Zhong et al. | ................ 385/130 |
| 6,615,615 | B1 * | 9/2003 | Zhong et al. | ................ 65/413 |
| 6,856,735 | B1 * | 2/2005 | Chang et al. | ................ 385/48 |

FOREIGN PATENT DOCUMENTS

JP       A 2001-4850       1/2001

\* cited by examiner

*Primary Examiner*—Michelle Connelly-Cushwa
*Assistant Examiner*—Tina M Wong
(74) *Attorney, Agent, or Firm*—Oliff & Berridge, PLC

(57) ABSTRACT

An optical transmission device improved in optical coupling loss between light guides and optical elements and excelling in efficiency of light utilization is provided with light guides having light incidence/emission sections on plural stepped portions, a substrate that fixes the light guides, and light receiving elements and light emitting elements arranged on the substrate to match the light incidence/emission sections of the light guides. The light receiving elements and the light emitting elements are arranged on the substrate by use of optical connectors. Coefficients of linear expansion and the rates of dimensional variation due to water absorption (or alternatively due to water absorption rates) of the light guides and the substrate here are substantially equalized.

31 Claims, 6 Drawing Sheets

OPTICAL TRANSMISSION DEVICE

BACKGROUND OF THE INVENTION

1. Field of the Invention

The present invention relates to an optical transmission device provided with light guides each having light incidence/emission sections and a substrate over which optical elements are arranged matching the light incidence/emission sections.

2. Description of the Prior Art

Known techniques in this regard include ones by which, when fixing light guides to a substrate, optical components are fabricated with the light guides and the substrate being matched in the coefficient of linear expansion. For instance, the Japanese Published Unexamined Patent Application No. 2001-4850 discloses a technique by which the coefficient of linear expansion of the substrate is matched to the material of optical waveguide. The yield of component production and the reliability of produced components are expected to be enhanced by the use of such a technique.

There are various available methods for fixing the light guides and the substrate including, for instance, one by which a positioning section provided on each light guide is butted against the reference plane of the substrate and another by which light guides are embedded in the substrate. Such light guides and a substrate can be formed by cutting and grinding, or injection-molding, plastic materials. For instance, in a light guide made up of a light transmitting section and a light incidence/emission section, where the distance (in the lengthwise direction) from a reference plane provided in the light transmitting section to an incidence/emission section (central part) at the tip is L mm and the coefficient of linear expansion is $M \times 10^{-5}/°$ C. for the light guides and $N \times 10^{-5}/°$ C. for the substrate, a temperature change by $T°$ C. would result in a difference in length by $L \times (M-N) \times 10^{-5} \times T$ (mm) from the reference plane to the incidence/emission section at the tip. This difference in length invites a positional lag between each light incidence/emission section of each light guide and each light incidence/emission optical element arranged on the substrate to match the light incidence/emission section. This positional lag may give rise to a significant loss in optical coupling between the light incidence/emission sections of each light guide and the light incidence/emission optical elements. In order to prevent such a positional lag, the materials are so selected as to match the light guides and the substrate in the coefficient of linear expansion.

However, even if materials substantially equal in the coefficient of linear expansion are selected for the light guides and the substrate, a significant loss in optical coupling between the light incidence/emission section of each light guide and the light incidence/emission optical element sometimes occurs. Such a loss in optical coupling has to be avoided because it would bring down the overall light utilizing efficiency of the device.

SUMMARY OF THE INVENTION

Therefore, the present invention provides an optical transmission device highly improved in the efficiency of light utilization by reducing the optical coupling loss between the light guides and the optical element.

The present inventors took note of the possibility that, even if materials substantially equal to the coefficient of linear expansion were selected for the light guides and the substrate, a significant loss in optical coupling between each light incidence/emission section of each light guide and each light incidence/emission optical element sometimes occurred, and made intensive inquiries into the cause of this phenomenon. As a result of the inquiries, they found the cause in the water absorption characteristics of the materials of the light guides and the substrate, and this discovery has led to the present invention. Thus, if the materials of the light guides and the substrate differ in water absorption characteristics, a length difference will occur between the light guides and the substrate, and so will a positional lag between each light incidence/emission section of each light guide positional lag and each light incidence/emission optical element. The invention is intended for improvement in this respect.

According to an aspect of the present invention, an optical transmission device includes light guides each having light incidence/emission sections, a substrate which fixes the light guides, and optical elements arranged on the substrate to match the light incidence/emission sections of the light guides, wherein the light guides and the substrate are substantially equal in the coefficient of linear expansion and in the rate of dimensional variation due to water absorption.

According to another aspect of the present invention, an optical transmission device includes light guides having light incidence/emission sections, a substrate which fixes the light guides, and optical elements arranged on the substrate to match the light incidence/emission sections of the light guides, wherein the light guides and the substrate are substantially equal in a coefficient of linear expansion and in a water absorption rate.

According to an another aspect of the present invention, an optical transmission device includes light guides each having light incidence/emission sections, a substrate which fixes the light guides, and optical elements arranged on the substrate to match the light incidence/emission sections of the light guides, wherein an extent of a positional lag between the light incidence/emission sections and the optical elements arising from a difference between the light guides and the substrate in a rate of dimensional variation due to water absorption is not more than 300 μm.

According to another aspect of the invention, an optical transmission device includes light guides each having light incidence/emission sections, a substrate which fixes the light guides, and optical elements arranged on the substrate to match the light incidence/emission sections of the light guides, wherein the light guides and the substrate are substantially equal in a coefficient of linear expansion and a difference in a rate of dimensional variation due to water absorption is: not more than 0.6% where a light guide size is 50 mm or less; not more than 0.3% where the light guide size is 50 to 100 mm; not more than 0.15% where the light guide size is 100 to 200 mm; not more than 0.1% where the light guide size is 200 to 300 mm; not more than 0.08% where the light size is 300 to 400 mm; not more than 0.06% where the light guide size is 400 to 500 mm; not more than 0.05% where the light guide size is 500 to 600 mm; not more than 0.04% where the light guide size is 600 to 800 mm; or not more than 0.03% where the light guide size is 800 to 1000 mm or more.

An optical transmission device according to another aspect of the invention includes light guides each having light incidence/emission sections, a substrate which fixes the light guides, and optical elements arranged on the substrate to match the light incidence/emission sections of the light guides, wherein a total of differences between the substrate and the light guides in a rate of dimensional variation due to linear expansion and the rate of the dimensional variation due to water absorption is: not more than 0.6% where the light guide size is 50 mm or less; not more than 0.3% where the light guide size is 50 to 100 mm; not more than 0.15% where the light guide size is 100 to 200 mm; not more than 0.1% where the light guide size is 200 to 300 mm; not more than 0.08% where the light guide size is 300 to 400 mm; not more than 0.06% where the light guide size is 400 to 500 mm; not more than 0.05% where the light guide size is 500 to 600 mm; not more than 0.04% where the light guide size is 600 to 800 mm; or not more than 0.03% where the light guide size is 800 to 1000 mm or more.

Further, an optical transmission device according to another aspect of the invention includes light guides each having light incidence/emission sections, a substrate which fixes the light guides, and optical elements arranged on the substrate to match the light incidence/emission sections of the light guides, wherein a relationship between the substrates and the light guides is such that: a difference in a coefficient of liner expansion is not more than 300% and a difference in a rate of dimensional variation due to water absorption is not more than 0.6% where a light guide size is 50 mm or less; the difference in the coefficient of linear expansion is not more than 150% and the difference in the rate of dimensional variation due to water absorption is not more than 0.3% where the light guide size is 50 to 100 mm; the difference in the coefficient of linear expansion is not more than 100% and the difference in the rate of dimensional variation due to water absorption is not more than 0.15% where the light guide size is 100 to 200 mm; the difference in the coefficient of linear expansion is not more than 80% and the difference in the rate of dimensional variation due to water absorption is not more than 0.1% where the light guide size is 200 to 300 mm; the difference in the coefficient of linear expansion is not more than 50% and the difference in the rate of dimensional variation due to water absorption is not more than 0.08% where the light guide size is 300 to 400 mm; the difference in the coefficient of linear expansion is not more than 40% and the difference in the rate of dimensional variation due to water absorption is not more than 0.06% where the light guide size is 400 to 500 mm; the difference in the coefficient of linear expansion is not more than 30% and the difference in the rate of dimensional variation due to water absorption is not more than 0.05% where the light guide size is 500 to 600 mm; the difference in the coefficient of linear expansion is not more than 25% and the difference in the rate of dimensional variation due to water absorption is not more than 0.04% where the light guide size is 600 to 800 mm; or the difference in the coefficient of linear expansion is not more than 15% and the difference in the rate of dimensional variation due to water absorption is not more than 0.03% where the light guide size is 800 to 1000 mm or more.

The optical elements here include, for instance, light receiving elements, light emitting elements and optical fibers, and can be held in a package and arranged on the substrate. The package can be in the form of optical connectors or optical plugs. At least two items of the light guides, the substrate and the package should preferably be formed of the same material. Each of the light guides has, at one end, plural stepped portions and, at the other end, a vertical face, and what has a reflecting section or a reflecting/diffusing section for optical signals on that vertical face at the other end can be used. Alternatively, each of the light guides may have, at one end, plural stepped portions and, at the other end, a vertical face, and an askew face each for altering the direction of optical signals at the two ends.

This configuration can reduce the optical coupling loss between the light guides and the optical element and provide an optical transmission device highly efficient in the utilization of light.

BRIEF DESCRIPTION OF THE DRAWINGS

These and other features and advantages of the present invention will become more apparent from the following description when taken in conjunction with the following drawings, wherein.

DESCRIPTION OF THE PREFERRED EMBODIMENTS

Figure 1A:
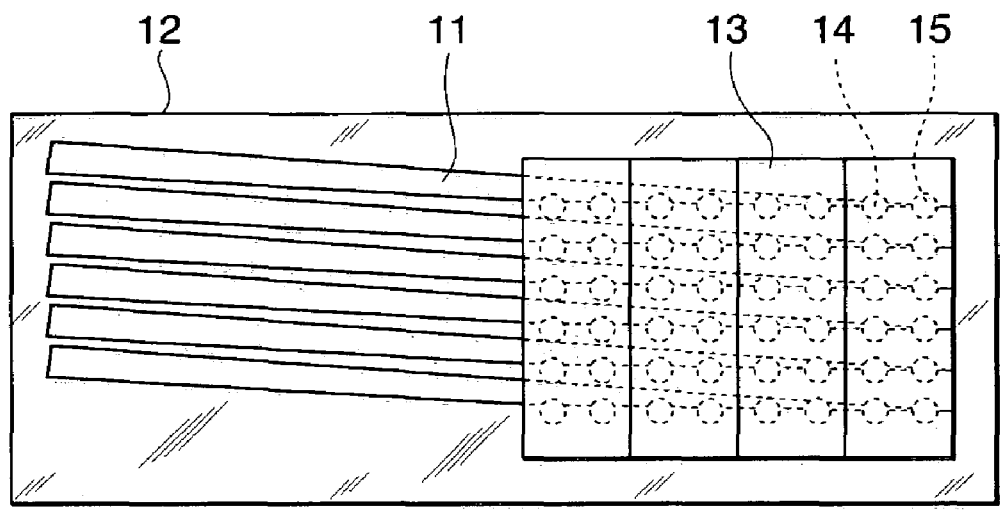
FIGS. 1A and 1B show an optical transmission device, which is a preferred embodiment of the present invention, FIG. 1A being a plan and FIG. 1B being a sectional view.
Figure 1B:
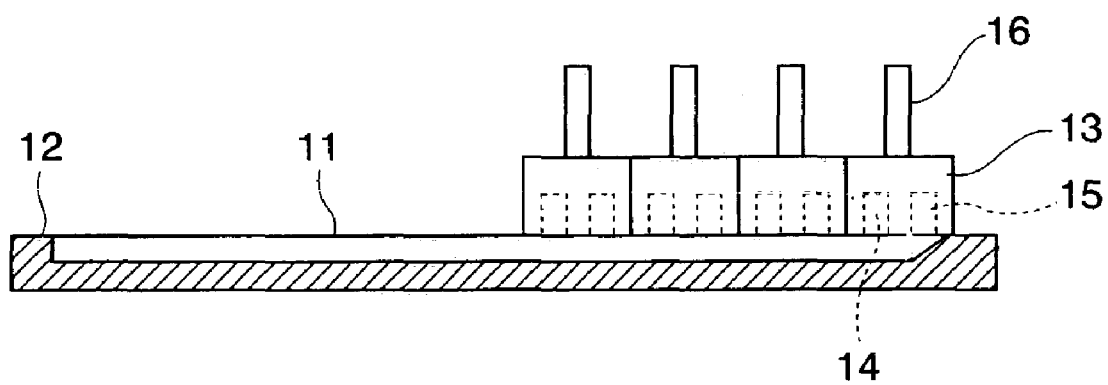

FIGS. 1A and 1B show an optical transmission device, which is a preferred embodiment of the present invention; FIG. 1A is a plan and FIG. 1B is a sectional view. In this embodiment, light guides 11 for six bits are fixed to a substrate 12 as illustrated. Each of the light guides 11 has stepped portions on each of which a light incidence/emission section is formed. The positioning of the light guides 11 relative to the substrate 12 can be accomplished by embedding the light guides in concaves formed in the substrate or, as will be described afterwards, by use of a triangular positioning projection provided on each light guide. The substrate 12 has an opening as illustrated, and plural optical connectors 13 are inserted into that opening. On each of the optical connectors 13 are arranged light receiving elements 14 and the light emitting elements 15, and each of the light receiving/emitting elements 14 and 15 is connected to an electronic circuit arranged on a board 16. In this way, the light incidence/emission sections of the plural stepped portions formed on the light guides 11 are enabled to be optically coupled to the light receiving/emitting elements 14 and 15 of the optical connectors 13.

In this embodiment of the invention, the light guides 11 and the substrate 12 are supposed to be substantially equal in the coefficient of linear expansion and the rate of dimensional variation due to water absorption (or alternatively to the water absorption rate). Since this makes the dimensional variations of the light guides 11 and the substrate 12 due to temperature and humidity variations substantially equal, the optical coupling loss between the light guides 11 and the light receiving/emitting elements 14 and 15 is reduced to provide an optical transmission device highly efficient in the utilization of light. This aspect will be described in detail, preceded by a description of an example of light guide configuration.

Figure 2A:
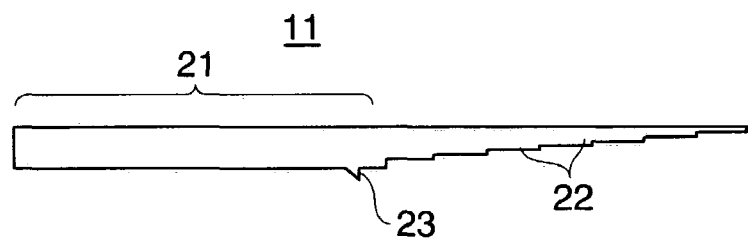
FIGS. 2A and 2B show details of the light guides illustrated in FIGS. 1A and 1B, 2A being a plan and FIG. 2B being a sectional view.
Figure 2B:

FIGS. 2A and 2B show details of the light guides illustrated in FIGS. 1A and 1B, FIG. 2A being a plan view and FIG. 2B being a sectional view. Each of the light guides 11 has a light transmitting section 21 and plural light incidence/emission sections 22. Each of the light incidence/emission sections 22 are formed on stepped portions, and each of the stepped portions has a 45°-askew face. The light transmitting section 21 is provided with a triangular positioning projection 23, which can be used as the reference plane. The propagation route of optical signals in a light guide 11 is the same as that in the light guide shown in FIGS. 3A and 3B to be described below.

Figure 3A:
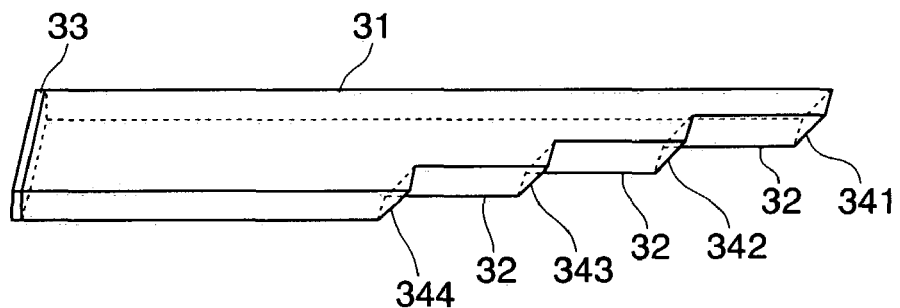
FIG. 3A shows an example of light guide having four light incidence/emission sections.

FIG. 3A shows an example of a light guide having four light incidence/emission sections. As illustrated, a light guide 31 of this example has a stepped portion 32 formed at one end, which is shaped like a rectangular parallelepiped, and a reflective layer 33 at the other end. The stepped portion 32 has light incidence/emission sections 341, 342, 343 and 344 cut askew at 45°. By these light incidence/emission sections, optical signals are brought to incidence on or emitted toward the upper face of the light guide 31.

Figure 3B:
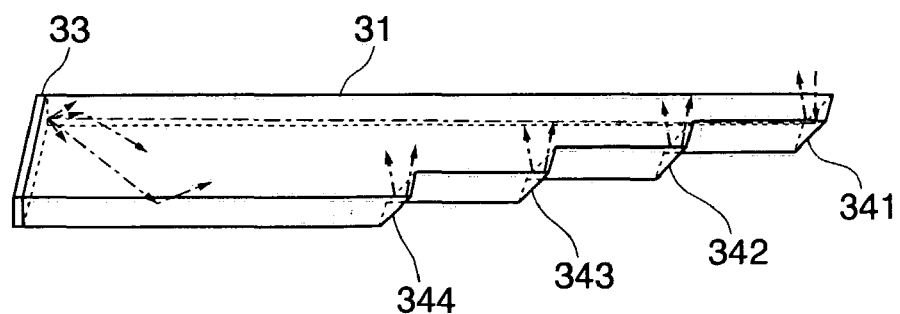
FIG. 3B illustrates an example of propagation (branching) route of optical signals.

FIG. 3B illustrates an example of propagation (branching) route of optical signals. In this example, optical signals come incident on the incidence/emission section 341, and are emitted from the light incidence/emission sections 341, 342, 343 and 344. Thus, optical signals coming incidence on the light incidence/emission section 341 are reflected at its 45°-askew end face, propagate in the light guide 31 leftward as illustrated, and reaches the reflective layer 33, which reflect them. The reflected optical signals propagate in the light guide 31 again, are guided to the light incidence/emission sections 341, 342, 343 and 344 and, reflected by their 45°-askew end faces, are emitted toward the upper face. The number of light incident/emission sections here is not limited to four, but can be either greater or smaller.

Referring back to FIG. 1 and FIG. 2, the light guide 11 has eight branches (eight stepped portions), and measures 450 mm in overall length, 1 mm in thickness and 357.5 mm in the length from the reference plane to the farthest incidence/emission section (central part). Its material is cycloolefin polymer, or ZEONEX 480R in trade name (a product of ZEON CORPORATION). In this case, the coefficient of linear expansion is $6 \times 10^{-5}/°$ C. and the water absorption rate is less than 0.01 (American Society of Testing and Materials (ASTM)).

On the other hand, the substrate 12 is made of, for instance, a copolymer of styrene, butadiene and acrylonitrile (ABS), or Toyolac 501 in trade name (a product of Toray). In this case, the coefficient of linear expansion is $7 \times 10^{-5}/°$ C., and the water absorption rate is 0.3 (ASTM) (the dimensional variation rate due to water absorption: 0.04% (at 23° C./95% RH)).

Where this combination is used, the difference in the variation of length (the difference between the substrate and the light guides in the variation of length from the reference plane (the triangular positioning projection 23) to the farthest incidence/emission section (central part)) due to temperature change is 357.5 mm×(7−6)×$10^{-5}/°$ C.×30° C.=107 μm (when the temperature has changed by 30° C.). The dimensional variation of ZEONEX due to water absorption being considered negligibly small, since the rate of dimensional variation due to water absorption by ABS is 0.04%, the difference between the substrate and the light guides in the variation of length from the reference plane (the triangular positioning projection 23) to the farthest incidence/emission section (central part)) is 35.7 mm×0.0004=143 μm.

Figure 4:
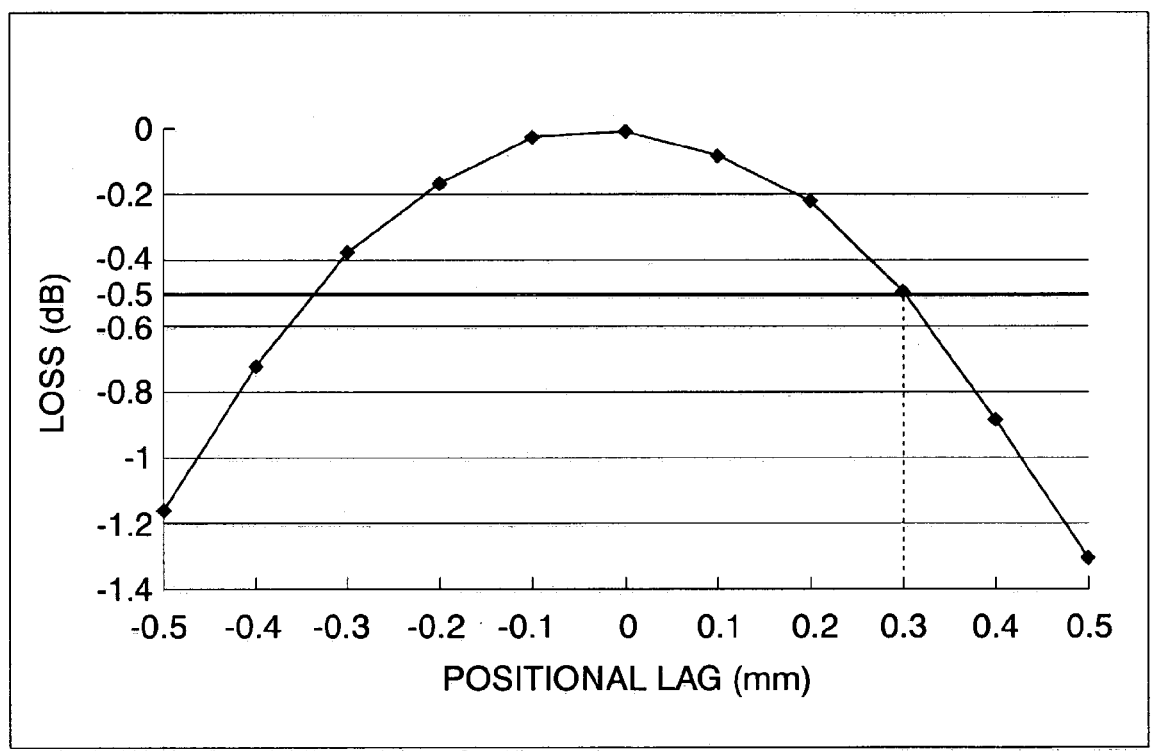
FIG. 4 is a graph showing the relationship of the optical loss to the positional lag between the light incidence/emission sections of the light guides and the light receiving element.

FIG. 4 is a graph showing the relationship of the optical loss to the positional lag between the light incidence/emission sections of the light guides and the light receiving element. This is a stimulation of an example in which each light incidence/emission section (incidence/emission area) of each light guide measures 1 mm×1 mm and a photodiode (PD) whose light receiving area is 0.8 mm in diameter is used as the light receiving element. Whereas the relationship between the loss and the extent of positional lag obviously varies with the dimensions of the emission area of the light guide and of the photodiode and other factors, where a loss of 0.5 dB is supposed to be the permissible range of the system, the permissible range of the positional lag will be 300 μm. In the combination described above, the difference in length between the substrate and the light guide is 143 μm and therefore within the permissible range.

Where light guides similar to that in the embodiment described above are to be used, a substrate made of modified polyphenylene ether on Xyron 500V in product name (a product of Asahi Kasei) of which the coefficient of linear expansion is $7 \times 10.5/°$ C. and the water absorption rate is 0.1, or fluoroplastics, such as DAIKIN INDUSTRIES' NEOFLON NTFE or NEOFLON CTEF, can be chosen. Other substrate materials having a relatively lower water absorption rate include polybutylene telephthalate (PBT) and polyphenylene sulfide (PPS). One of these materials can be selected to match the coefficient of linear expansion of the light guides.

On the other hand, if an ABS material known as Toyolac-parel TP10 in product name (a product of Toray) issued, the rate of dimensional variation due to water absorption will be 0.17% (23° C./95%RH), and the difference between the substrate and the light guide in the variation of length from the reference plane to the farthest incidence/emission section will be 357.5 mm×0.0017=608 μm. In this case, as the difference surpasses the permissible range of 300 μm, the coupling loss will be too great to permit the use of the device.

Or where polymethyl methacrylates (PMMA), or ACRYLITE L in trade name (a product of Mitsubishi Royan), is used as the material of the light guide, its coefficient of linear expansion is $7 \times 10^{-5}/°$ C. and its water absorption rate, 0.3 (ASTM). Similarly, where a copolymer of styrene, butadiene and acrylonitrile (ABS), or Toyolac 501 in trade name (a product of Toray), is chosen for the substrate, its coefficient of linear expansion is $7.5 \times 10^{-5}/°$ C. and its water absorption rate, 0.5 (the rate of dimensional variation due to water absorption: 0.04% (23° C./95%RH)). When this combination is used, the difference in the variation of length due to temperature change is negligible. However, the rate of dimensional variation due to water absorption of ACRYLITE L (when the relative humidity has varied from 50 to 90% according to the graph contained in the pertinent product catalog (Lines of ACRYLITE Products) p. 17) is 357.5 mm×(0.28−0.12)×0.01=572 μm. As this surpasses the permissible range of 300 μm, the positional lag between the light guide and the light incidence/emission optical element will expand, causing trouble to transmission.

Where a material whose rate of dimensional variation is great, such as PMMA, is used for the light guide, it is desirable to choose PMMA also as the substrate material.

Figure 5A:
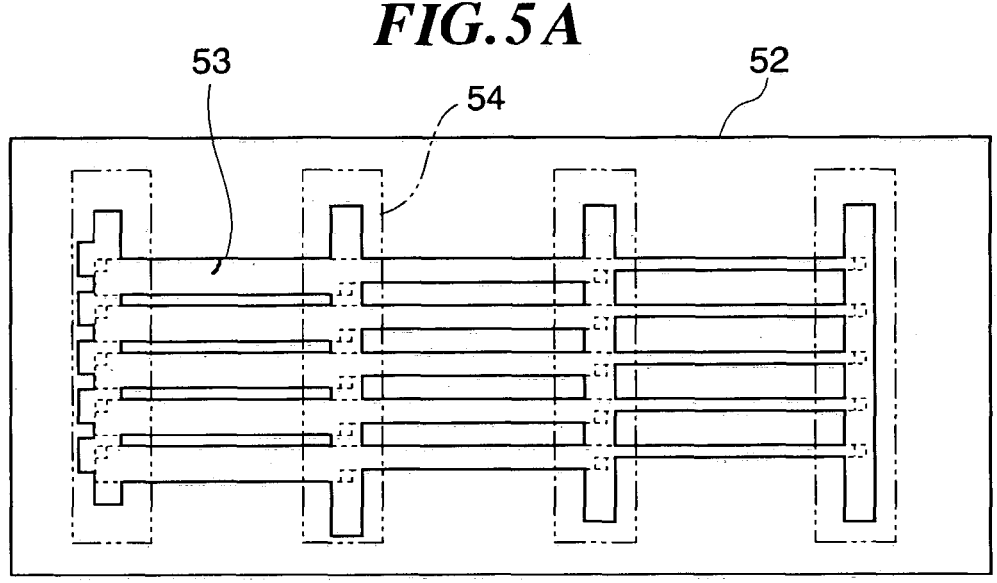
FIGS. 5A and 5B show an optical transmission device, which is another preferred embodiment of the invention, and FIG. 5A being a plan view and FIG. 5B being a profile view.
Figure 5B:
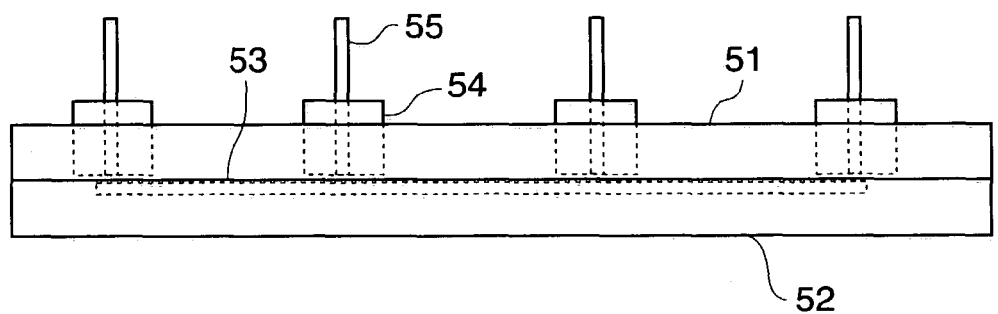

FIGS. 5A and 5B show an optical transmission device, which is another preferred embodiment of the invention, FIG. 5A being a plan view and FIG. 5B being a profile view. In this embodiment of the invention, light guides 53 for five bits are fixed between an the upper substrate 51 and a lower substrate 52 as illustrated. In FIG. 5A, the illustration of the upper surface 51 is dispensed with. The positioning and fixing of the light guides 53 are accomplished by embedding the light guides 53 in the lower substrate 52. Each of the light guides 53 has plural stepped portions, and a light incidence/emission section is formed on each stepped portion. An opening is bored in the part of the upper substrate 51 matching each light incidence/emission section of the light guide, and an optical plug 54 is inserted into the opening. For each of the optical plugs 54 is arranged an optical fiber 55. In this way, the light incidence/emission sections of the plural stepped portions formed on the light guides 53 are enabled to be optically coupled to the optical fibers 55 held by the optical plugs 54.

In this embodiment, the light guides 53 and the upper and lower substrates 51 and 52 are substantially equal in the coefficient of linear expansion and the rate of dimensional variation due to water absorption (or alternatively due to water absorption rate). As this results in substantially equal dimensional variations of the light guides 53 and the substrates with temperature and humidity changes, the optical coupling loss between the light guides 53 and the optical fibers 55 is reduced, and an optical transmission device highly efficient in the utilization of light can be obtained. The configuration of each light guide used here will be described below.

Figure 6A:
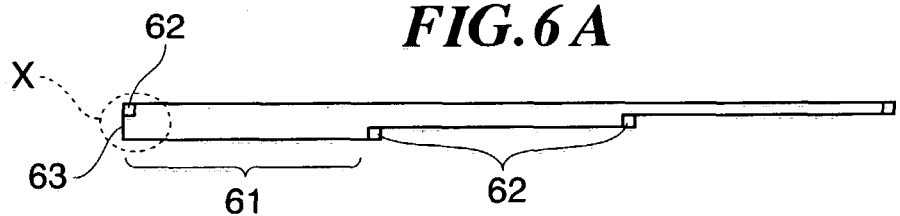
FIGS. 6A–6C show details of the light guide illustrated in FIGS. 5A and 5B, FIG. 6A being a plan view, FIG. 6B being a profile view and FIG. 6C schematically illustrating a 45° angle characteristic of the light incidence/emission sections.
Figure 6B:
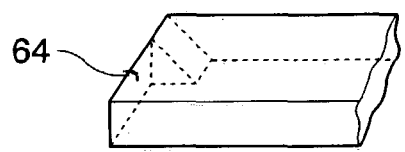
Figure 6C:
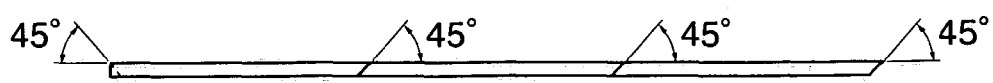

FIGS. 6A and 6B show details of the light guide illustrated in FIGS. 5A and 5B, FIG. 6A being a plan view and FIG. 6B being a profile view. Each of the light guides 53 has a light transmitting section 61 and plural light incidence/emission sections 62. The light incidence/emission sections 62 are formed on stepped portions and part of the end face 63 of the light transmitting section 61, each having a 45°-askew face (see FIG. 6C). At the end face of the light transmitting section 61 is also provided a reference plane 64 (positioning section) in the lengthwise direction of the light guide. Regarding to propagation routes of optical signals in the light guide 53, input signals from the plural incidence/emission sections 62 formed on the stepped portions are output from the incidence/emission section 62 formed on the end face 63 of the light transmitting section 61, and input signals from the incidence/emission section 62 formed on the end face 63 of the light transmitting section 61 are output from the plural incidence/emission sections 62 formed on the stepped portions.

Each of the light guides in this embodiment has three branches (three stepped portions), and measures 62 mm in overall length, 0.5 mm in thickness and 61.75 mm in the length from the reference plane to the farthest incidence/emission section (central part). Its material is cycloolefin polymer, or ZEONEX 480R in trade name (a product of ZEON CORPORATION). On the other hand, the upper and lower substrates 51 and 52 are made of a copolymer of styrene, butadiene and acrylonitrile (ABS), or Toyolac 501 in product name (a product of Toray). In this combination, the variation in length due to a temperature change is 61.75 mm×(7−6)×10$^{-5}$/° C.×30° C.=19 μm (where the temperature has changed by 30° C.). Since in this case the dimensional variation rate due to water absorption by ABS is 0.04%, the difference in length between the substrates from the reference plane to the farthest incidence/emission section is 61.75 mm×0.0004=25 μm. Therefore, this combination also is within the permissible range.

As stated above, although the relationship between the loss and the extent of positional lag obviously varies with the dimensions of the emission area of each light guide and of the photodiode and other factors, where a loss of about 0.5 dB is supposed to be the permissible range of the system, the permissible range of the positional lag will be 300 μm according to the relationship between the positional lag and the loss shown in FIG. 4, for example.

Figure 7:
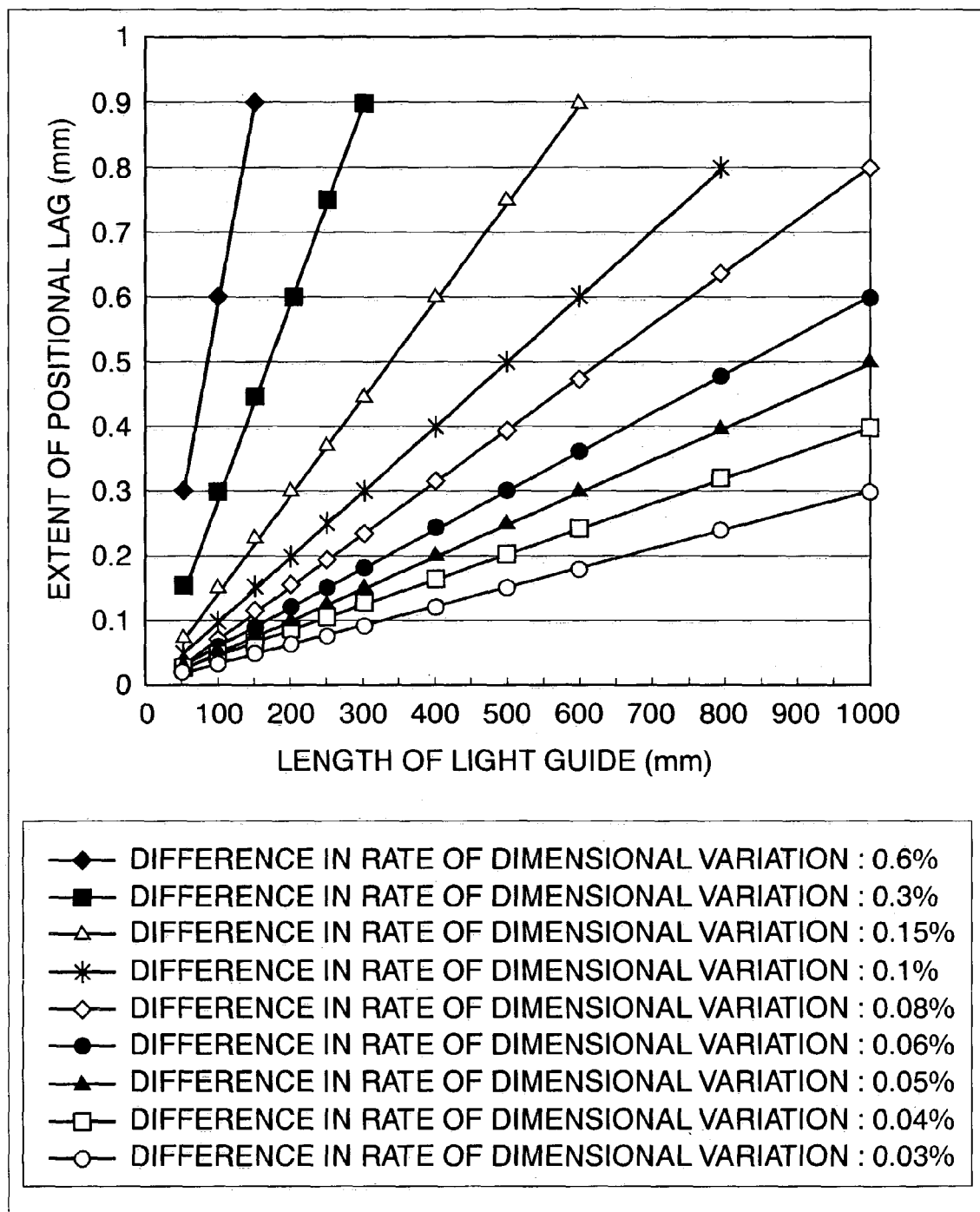
FIG. 7 shows the relationship between the light guide length and the extent of the positional lag when the difference between the substrates and the light guides in dimensional variation rate is varied.
Figure 8:
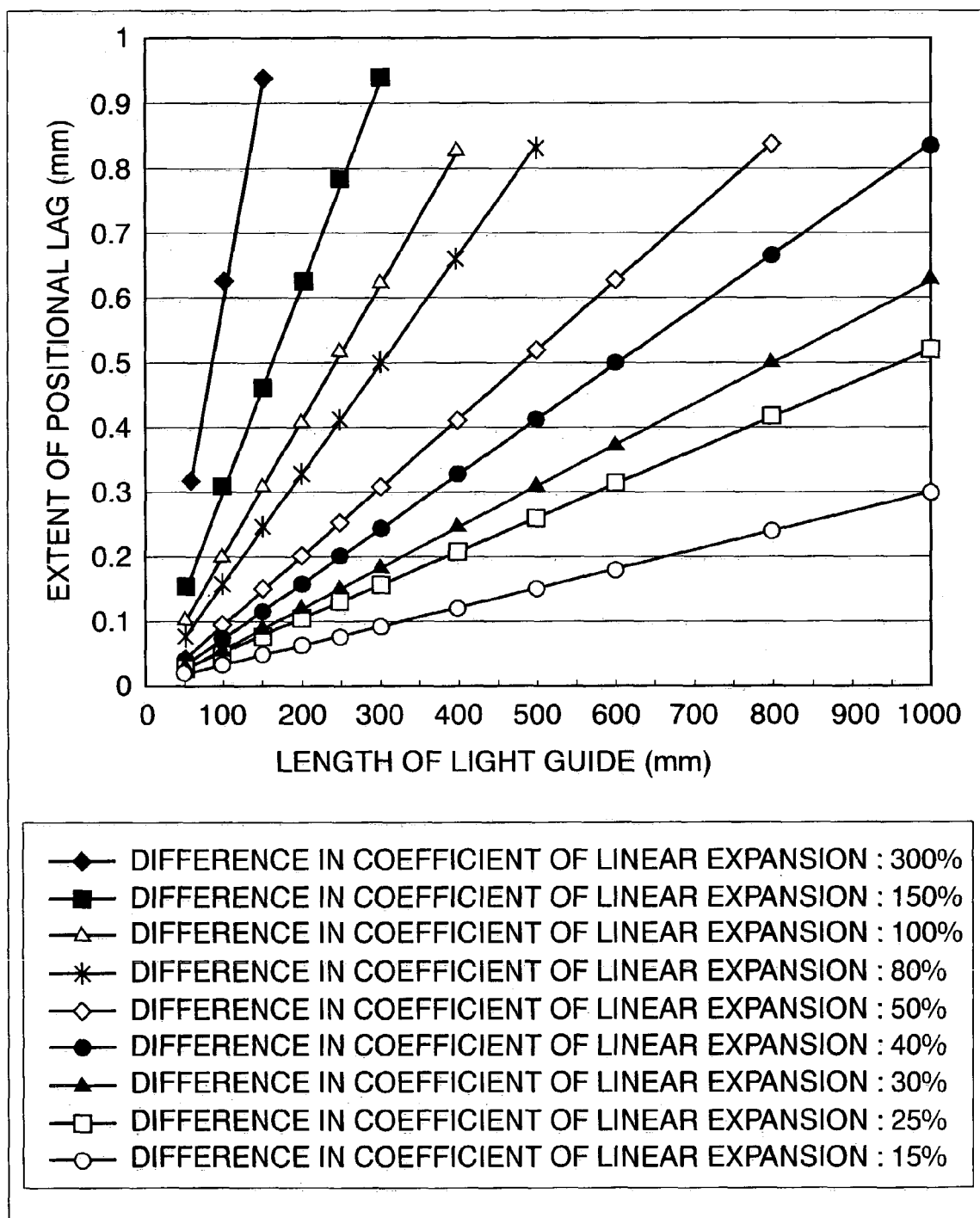
FIG. 8 shows the relationship between the light guide length and the extent of the positional lag when the difference between the substrates and the light guides in the coefficient of linear expansion is varied.

FIG. 7 shows the relationship between the light guide length and the extent of the positional lag when the difference between the substrates and the light guides in dimensional variation rate is varied. To focus on a position where the extent of the positional lag is 0.3 mm (300 μm), it is seen that the greater the light guide length, the smaller the difference in dimensional variation rate should be. FIG. 8 shows the relationship between the light guide length and the extent of the positional lag when the difference between the substrates and the light guides in the coefficient of linear expansion is varied. To focus on a position where the extent of the positional lag is 0.3 mm (300 μm), it is seen that, in this case too, the greater the light guide length, the smaller the difference in dimensional variation rate should be. Incidentally, FIG. 8 shows a case in which the coefficient of linear expansion of the light guide is 7.0×10$^{-5}$/° C. and the temperature has changed by 30° C.

The following can be said from the graphs of FIG. 7 and FIG. 8.

(1) In order to keep the extent of the positional lag within the permissible range, the substrates and the light guides should be substantially equal in the coefficient of linear expansion and the difference in the rate of dimensional variation due to water absorption should be:

not more than 0.6% where the light guide size is 50 mm or less;

not more than 0.3% where the light guide size is 50 to 100 mm;

not more than 0.15% where the light guide size is 100 to 200 mm;

not more than 0.1% where the light guide size is 200 to 300 mm;

not more than 0.08% where the light guide size is 300 to 400 mm;

not more than 0.06% where the light guide size is 400 to 500 mm;

not more than 0.05% where the light guide size is 500 to 600 mm;

not more than 0.04% where the light guide size is 600 to 800 mm; or not more than 0.03% where the light guide size is 800 to 1000 mm or more.

(2) In order to keep the extent of the positional lag within the permissible range, the total of the differences between the substrates and the light guides in the rate of dimensional variation due to linear expansion (temperature change) and the rate of the dimensional variation due to water absorption should be:

not more than 0.6% where the light guide size is 50 mm or less;

not more than 0.3% where the light guide size is 50 to 100 mm;

not more than 0.15% where the light guide size is 100 to 200 mm;

not more than 0.1% where the light guide size is 200 to 300 mm;

not more than 0.08% where the light guide size is 300 to 400 mm;

not more than 0.06% where the light guide size is 400 to 500 mm;

not more than 0.05% where the light guide size is 500 to 600 mm;

not more than 0.04% where the light guide size is 600 to 800 mm; or not more than 0.03% where the light guide size is 800 to 1000 mm or more.

(3) In order to keep the extent of the positional lag within the permissible range, the relationship between the substrates and the light guides should be such that:

the difference in the coefficient of linear expansion should not be more than 300% and the difference in the rate of dimensional variation due to water absorption should not be more than 0.6% where the light guide size is 50 mm or less;

the difference in the coefficient of linear expansion should not be more than 150% and the difference in the rate of dimensional variation due to water absorption should not be more than 0.3% where the light guide size is 50 to 100 mm;

the difference in the coefficient of linear expansion should not be more than 100% and the difference in the rate of dimensional variation due to water absorption should not be more than 0.15% where the light guide size is 100 to 200 mm;

the difference in the coefficient of linear expansion should not be more than 80% and the difference in the rate of dimensional variation due to water absorption should not be more than 0.1% where the light guide size is 200 to 300 mm;

the difference in the coefficient of linear expansion should not be more than 50% and the difference in the rate of dimensional variation due to water absorption should not be more than 0.08% where the light guide size is 300 to 400 mm;

the difference in the coefficient of linear expansion should not be more than 40% and the difference in the rate of dimensional variation due to water absorption should not be more than 0.06% where the light guide size is 400 to 500 mm;

the difference in the coefficient of linear expansion should not be more than 30% and the difference in the rate of dimensional variation due to water absorption should not be more than 0.05% where the light guide size is 500 to 600 mm;

the difference in the coefficient of linear expansion should not be more than 25% and the difference in the rate of dimensional variation due to water absorption should not be more than 0.04% where the light guide size is 600 to 800 mm; or the difference in the coefficient of linear expansion should not be more than 15% and the difference in the rate of dimensional variation due to water absorption should not be more than 0.03% where the light guide size is 800 to 1000 mm or more.

Although the coefficients of linear expansion and the rates of dimensional variation due to water absorption (or alternatively due to the water absorption rate) of light guides and substrates to which the light guides are to be fixed were discussed in the foregoing description of the preferred embodiments of the invention, the optical coupling loss can be further reduced by selecting the materials of the package (including optical connectors and optical plugs) in which optical elements such as light incidence/emission optical elements and optical fibers from the same point of view.

By fabricating an optical transmission device with the differences in the coefficient of linear expansion and in the rate of dimensional variation due to the water absorption characteristics of the materials being kept within a permissible range in the selection of materials for the light guides and the substrate, and further for the optical connectors and the optical plugs, the positional lag between the light guides and the optical elements due to ambient temperature and humidity factors can be reduced, resulting in a system highly efficient in the utilization of light.

According to the present invention, the optical coupling loss between light guides and optical elements can be reduced, and an optical transmission device highly efficient in the utilization of light can be provided.

The entire disclosure of Japanese Patent Application No. 2002-220945 filed on Jul. 30, 2002 including specification, claims, drawings and abstract is incorporated herein by reference in its entirety.

What is claimed is:

1. An optical transmission device comprising light guides each having light incidence/emission sections, a substrate which fixes the light guides, and optical elements arranged on the substrate to match the light incidence/emission sections of the light guides, wherein the light guides and the substrate are made of different base materials substantially equal in a coefficient or linear expansion and in a rate of dimensional variation due to water absorption.

2. The optical transmission device according to claim 1, wherein a difference in the rate of dimensional variation due to water absorption is:

not more than 0.6% where a light guide size is 50 mm or less;

not more than 0.3% where the light guide size is 50 to 100 mm;

not more than 0.15% where the light guide size is 100 to 200 mm;

not more than 0.1% where the light guide size is 200 to 300 mm;

not more than 0.08% where the light guide size is 300 to 400 mm;

not more than 0.06% where the light guide size is 400 to 500 mm;

not more than 0.05% where the light guide size is 500 to 600 mm;

not more than 0.04% where the light guide size is 600 to 800 mm; or not more than 0.03% where the light guide size is 800 to 1000 mm or more.

3. The optical transmission device according to claim 2, wherein the optical elements are held in a package and arranged on the substrate.

4. The optical transmission device according to claim 3, wherein the package is in the form of an optical connector or optical plug.

5. The optical transmission device according to claim 3, wherein the package and one of the light guides and the substrate are formed of the same material.

6. An optical transmission device comprising light guides each having light incidence/emission sections, a substrate which fixes the light guides, and an optical element arranged on the substrate to match the light incidence/emission sections of the light guides, wherein each of the light guides has plural stepped portions at one end and a vertical face at the other end, and wherein the light guides and the substrate are substantially equal in a coefficient of linear expansion and in a rate of dimensional variation due to water absorption.

7. An optical transmission device comprising light guides each having light incidence/emission sections, an substrate which fixes the light guides, and optical elements arranged on the substrate to match the light incidence/emission sections of the light guides, wherein each of the light guides has plural stepped portions at one end, a vertical face at the other end, and askew faces each for altering a direction of optical signals at both ends, and wherein the light guides and the substrate are substantially equal in a coefficient of linear expansion and in a rate of dimensional variation due to water absorption.

8. An optical transmission device comprising light guides each having light incidence/emission sections, a substrate which fixes the light guides, and optical elements arranged on the substrate to match the light incidence/emission sections of the light guides, wherein the light guides and the substrate are made of different base materials substantially equal in a coefficient of linear expansion and in a water absorption rate.

9. The optical transmission device according to claim 8, wherein the optical elements are held in a package and arranged on the substrate.

10. The optical transmission device according to claim 9, wherein the package is in the form of an optical connector or optical plug.

11. The optical transmission device according to claim 9, wherein the package and one of the light guides and the substrate are formed of the same material.

12. An optical transmission device comprising light guides each having light incidence/emission sections, a substrate which fixes the light guides, and optical elements arranged on the substrate to match the light incidence/emission sections of the light guides, wherein each of the light guides has plural stepped portions at one end and a vertical face provided with a reflecting section or a reflecting/diffusing section at the other end, and wherein the light guides and the substrate are substantially equal in coefficient or linear expansion and in a water absorption rate.

13. An optical transmission device comprising light guides each having light incidence/emission sections, a substrate which fixes the light guides, and optical elements arranged on the substrate to match the light incidence/emission section of the light guides, wherein each of the light guides has plural stepped portions at one end, a vertical face at the other end, and askew faces each for altering a direction of optical signals at the both ends, and wherein the light guides and the substrate are substantially equal in a coefficient of linear expansion and in a water absorption rate.

14. An optical transmission device comprising light guides each having light incidence/emission sections, a substrate made of a different base material and that fixes the light guides, and optical elements arranged on the substrate to match the light incidence/emission sections of the light guides, wherein an extent of a positional lag between the light incidence/emission sections and the optical element arising from a difference between the light guides and the substrate in a rate of dimensional variation due to water absorption is not more than 300 μm.

15. The optical transmission device according to claim 14, wherein the optical elements are held in a package and arranged on the substrate.

16. The optical transmission device according to claim 15, wherein the package is in the form of an optical connector or optical plug.

17. The optical transmission device according to claim 15, wherein the package and one of the light guides and the substrate are formed of the same material.

18. An optical transmission device comprising light guides each having light incidence/emission sections, a substrate that fixes the light guides, and optical elements arranged on the substrate to match the light incidence/emission sections of the light guides, wherein each of the light guides has plural stepped portions at one end and a vertical face provided with a reflecting section or a reflecting/diffusing section at the other end, and wherein an extent of a positional lag between the light incidence/emission sections and the optical elements arising from a difference between the light guides and the substrate in a rate of dimensional variation due to water absorption is not more than 300 μm.

19. An optical transmission device comprising light guides each having light incidence/emission sections, a substrate that fixes the light guides, and optical elements arranged on the substrate to match the light incidence/emission sections of the light guides, wherein each of the light guides has plural stepped portions at one end, a vertical face at the other end and askew faces each for altering a direction of optical signals at the both ends, and wherein an extent of a positional lag between the light incidence/emission sections and the optical elements arising from a difference between the light guides and the substrate in a rate of dimensional variation due to water absorption is not more than μm.

20. An optical transmission device comprising light guides each having light incidence/emission sections, a substrate made of a different base material and that fixes the light guides, and optical elements arranged on the substrate to match the light incidence/emission sections of the light guides, wherein a total of differences between the substrate and the light guides in a rate of dimensional variation due to linear expansion and the rate of the dimensional variation due to water absorption is:
  not more than 0.6% where the light guide size is 50 mm or less;
  not more than 0.3% where the light guide size is 50 to 100 mm;
  not more than 0.15% where the light guide size is 100 to 200 mm;
  not more than 0.1% where the light guide size is 200 to 300 mm;
  not more than 0.08% where the light guide size is 300 to 400 mm;
  not more than 0.06% where the light guide size is 400 to 500 mm;
  not more than 0.05% where the light guide size is 500 to 600 mm;
  not more than 0.04% where the light guide size is 600 to 800 mm; or
  not more than 0.03% where the light guide size is 800 to 1000 mm or more.

21. The optical transmission device according to claim 20, wherein the optical elements are held in a package and arranged on the substrate.

22. The optical transmission device according to claim 21, wherein the package is in the form of an optical connector or optical plug.

23. The optical transmission device according to claim 21, wherein the package and one of the light guides and the substrate are formed of the same material.

24. An optical transmission device comprising light guides each having light incidence/emission sections, a substrate that fixes the light guides, and optical elements arranged on the substrate to match the light incidence/emission sections of the light guides, wherein each of the light guides has plural stepped portions at one end and a vertical face provided with a reflecting section or a reflecting/diffusing section at the other end, and wherein a total of differences between the substrate and the light guides in a rate of dimensional variation due to linear expansion and the rate of the dimensional variation due to water absorption is:

not more than 0.6% where the light guide size is 50 mm or less;
not more than 0.3% where the light guide size is 50 to 100 mm;
not more than 0.15% where the light guide size is 100 to 200 mm;
not more than 0.1% where the light guide size is 200 to 300 mm;
not more than 0.08% where the light guide size is 300 to 400 mm;
not more than 0.06% where the light guide size is 400 to 500 mm;
not more than 0.05% where the light guide size is 500 to 600 mm;
not more than 0.04% where the light guide size is 600 to 800 mm; or
not more than 0.03% where the light guide size is 800 to 1000 mm or more.

25. An optical transmission device comprising light guides each having light incidence/emission sections, a substrate that fixes the light guides, and optical elements arranged on the substrate to match the light incidence/emission sections of the light guides, wherein each of the light guides has plural stepped portions at one end a vertical face at the other end and askew faces each for altering a direction of optical signals at the both ends, and wherein a total of differences between the substrate and the light guides in a rate of dimensional variation due to linear expansion and the rate of the dimensional variation due to water absorption is:

not more than 0.6% where the light guide size is 50 mm or less;
not more than 0.3% where the light guide size is 50 to 100 mm;
not more than 0.15% where the light guide size is 100 to 200 mm;
not more than 0.1% where the light guide size is 200 to 300 mm;
not more than 0.08% where the light guide size is 300 to 400 mm;
not more than 0.06% where the light guide size is 400 to 500 mm;
not more than 0.05% where the light guide size is 500 to 600 mm;
not more than 0.04% where the light guide size is 600 to 800 mm; or
not more than 0.03% where the light guide size is 800 to 1000 mm or more.

26. An optical transmission device comprising light guides each having light incidence/emission sections, a substrate made of a different base material and that fixes the light guides, and optical elements arranged on the substrate to match the light incidence/emission sections of the light guides, wherein a relationship between the substrate and the light guides is such that:

a difference in a coefficient of linear expansion is not more than 300% and a difference in a rate of dimensional variation due to water absorption is not more than 0.6% where the light guide size is 50 mm or less;
the difference in the coefficient of linear expansion is not more than 150% and the difference in the rate of dimensional variation due to water absorption is not more than 0.3% where the light guide size is 50 to 100 mm;
the difference in the coefficient of linear expansion is not more than 100% and the difference in the rate of dimensional variation due to water absorption is not more than 0.15% where the light guide size is 100 to 200 mm;
the difference in the coefficient of linear expansion is not more than 80% and the difference in the rate of dimensional variation due to water absorption is not more than 0.1% where the light guide size is 200 to 300 mm;
the difference in the coefficient of linear expansion is not more than 50% and the difference in the rate of dimensional variation due to water absorption is not more than 0.08% where the light guide size is 300 to 400 mm;
the difference in the coefficient of linear expansion is not more than 40% and the difference in the rate of dimensional variation due to water absorption is not more than 0.06% where the light guide size is 400 to 500 mm;
the difference in the coefficient of linear expansion is not more than 30% and the difference in the rate of dimensional variation due to water absorption is not more than 0.05% where the light guide size is 500 to 600 mm;
the difference in the coefficient of linear expansion is not more than 25% and the difference in the rate of dimensional variation due to water absorption is not more than 0.04% where the light guide size is 600 to 800 mm; or
the difference in the coefficient of linear expansion is not more than 15% and the difference in the rate of dimensional variation due to water absorption is not more than 0.03% where the light guide size is 800 to 1000 mm or more.

27. The optical transmission device according to claim 26, wherein the optical elements are held in a package and arranged on the substrate.

28. The optical transmission device according to claim 27, wherein the package is in the form of an optical connector or optical plug.

29. The optical transmission device according to claim 27, wherein the package and one of the light guides and the substrate are formed of the same material.

30. An optical transmission device comprising light guides each having light incidence/emission sections, a substrate that fixes the light guides, and optical elements arranged on the substrate to match the light incidence/emission sections of the light guides, wherein each of the light guides has plural stepped portions at one end and a vertical face provided with a reflecting section or a reflecting/diffusing section at the other ed, and wherein a relationship between the substrate and the light guides is such that:

a difference in a coefficient of linear expansion is not more than 300% and a difference in a rate of dimensional variation due to water absorption is not more than 0.6% where the light guide size is 50 mm or less;
the difference in the coefficient of linear expansion is not more than 150% and the difference in the rate of dimensional variation due to water absorption is not more than 0.3% where the light guide size is 50 to 100 mm;

the difference in the coefficient of linear expansion is not more than 100% and the difference in the rate of dimensional variation due to water absorption is not more than 0.15% where the light guide size is 100 to 200 mm;

the difference in the coefficient of linear expansion is not more than 80% and the difference in the rate of dimensional variation due to water absorption is not more than 0.1% where the light guide size is 200 to 300 mm;

the difference in the coefficient of linear expansion is not more than 50% and the difference in the rate of dimensional variation due to water absorption is not more than 0.08% where the light guide size is 300 to 400 mm;

the difference in the coefficient of linear expansion is not more than 40% and the difference in the rate of dimensional variation due to water absorption is not more than 0.06% where the light guide size is 400 to 500 mm;

the difference in the coefficient of linear expansion is not more than 30% and the difference in the rate of dimensional variation due to water absorption is not more than 0.05% where the light guide size is 500 to 600 mm;

the difference in the coefficient of linear expansion is not more than 25% and the difference in the rate of dimensional variation due to water absorption is not more than 0.04% where the light guide size is 600 to 800 mm; or the difference in the coefficient of linear expansion is not more than 15% and the difference in the rate of dimensional variation due to water absorption is not more than 0.03% where the light guide size is 800 to 1000 mm or more.

31. An optical transmission device comprising light guides each having light incidence/emission sections, a substrate that fixes the light guides, and optical elements arranged on the substrate to match the liquid incidence/emission sections of the light guides, wherein each of the light guide has plural stepped portions at one end, a vertical face at the other end and askew faces each for altering a direction of optical signals at the both ends, and wherein a relationship between the substrate and the light guides is such that:

a difference in a coefficient of linear expansion is not more than 300% and a difference in a rate of dimensional variation due to water absorption is not more than 0.6% where the light guide size is 50 mm or less;

the difference in the coefficient of linear expansion is not more than 150% and the difference in the rate of dimensional variation due to water absorption is not more than 0.3% where the light guide size is 50 to 100 mm;

the difference in the coefficient of linear expansion is not more than 100% and the difference in the rate of dimensional variation due to water absorption is not more than 0.15% where the light guide size is 100 to 200 mm;

the difference in the coefficient of linear expansion is not more than 80% and the difference in the rate of dimensional variation due to water absorption is not more than 0.1% where the light guide size is 200 to 300 mm;

the difference in the coefficient of linear expansion is not more than 50% and the difference in the rate of dimensional variation due to water absorption is not more than 0.08% where the light guide size is 300 to 400 mm;

the difference in the coefficient of linear expansion is not more than 40% and the difference in the rate of dimensional variation due to water absorption is not more than 0.06% where the light guide size is 400 to 500 mm;

the difference in the coefficient of linear expansion is not more than 30% and the difference in the rate of dimensional variation due to water absorption is not more than 0.05% where the light guide size is 500 to 600 mm;

the difference in the coefficient of linear expansion is not more than 25% and the difference in the rate of dimensional variation due to water absorption is not more than 0.04% where the light guide size is 600 to 800 mm; or the difference in the coefficient of linear expansion is not more than 15% and the difference in the rate of dimensional variation due to water absorption is not more than 0.03% where the light guide size is 800 to 1000 mm or more.

* * * * *